(12) United States Patent
Matsumoto et al.

(10) Patent No.: US 6,689,504 B1
(45) Date of Patent: Feb. 10, 2004

(54) FUEL CELL STACK WITH SEPARATOR OF A LAMINATE STRUCTURE

(75) Inventors: Toshihiro Matsumoto, Ibaraki (JP); Kazuhito Hatoh, Osaka (JP); Hisaaki Gyoten, Shijonawate (JP); Hideo Ohara, Katano (JP); Kazufumi Nishida, Moriguchi (JP); Teruhisa Kanbara, Ikeda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/786,728

(22) PCT Filed: Sep. 20, 1999

(86) PCT No.: PCT/JP99/05151

§ 371 (c)(1),
(2), (4) Date: Mar. 8, 2001

(87) PCT Pub. No.: WO00/19555

PCT Pub. Date: Apr. 6, 2000

(30) Foreign Application Priority Data

Sep. 25, 1998 (JP) ............................................ 10-270861

(51) Int. Cl.[7] .......................... H01M 8/02; H01M 8/10
(52) U.S. Cl. .............................. 429/39; 429/38; 429/35
(58) Field of Search ............................... 429/34, 35, 36, 429/38, 39

(56) References Cited

U.S. PATENT DOCUMENTS

| | | | |
|---|---|---|---|
| 3,484,298 A | 12/1969 | Nichols | |
| 4,774,154 A | * 9/1988 | Singelyn et al. | 429/36 |
| 5,300,370 A | 4/1994 | Washington et al. | |
| 5,683,828 A | 11/1997 | Spear et al. | |

FOREIGN PATENT DOCUMENTS

| | | |
|---|---|---|
| DE | 197 34 729 | 12/1998 |
| JP | 04-267062 | 9/1992 |
| JP | 05-029001 | 2/1993 |
| JP | 05-109415 | 4/1993 |
| JP | 06-333580 | 12/1994 |
| JP | 07-240218 | 9/1995 |
| JP | 09-204924 | 8/1997 |
| WO | 98/50973 | 11/1998 |

* cited by examiner

Primary Examiner—Randy Gulakowski
Assistant Examiner—Jonathan Crepeau
(74) Attorney, Agent, or Firm—McDermott, Will & Emery

(57) ABSTRACT

The present invention provides a fuel cell stack including a plurality of unit cells laid one upon another. Each of the unit cells includes an electrolyte, a pair of electrodes that are arranged across the electrolyte and respectively have a catalytic reaction layer, and a separator having means for feeding a supply of gaseous fuel to one of the electrodes and a supply of oxidant gas to the other of the electrodes. The separator is a laminate including a gas-tight conductive plate A and another conductive plate B having at least one slit, which continuously meanders from one end to another end of the conductive plate B. The technique of the present invention gives a compact fuel cell stack assembled by a simple process.

5 Claims, 6 Drawing Sheets

FUEL CELL STACK WITH SEPARATOR OF A LAMINATE STRUCTURE

TECHNICAL FIELD

The present invention relates to a fuel cell, especially a polymer electrolyte fuel cell, which is used for portable power sources, electric vehicle power sources, and domestic cogeneration systems.

BACKGROUND ART

The fuel cells, especially the polymer electrolyte fuel cells, cause a fuel gas such as hydrogen, and an oxidant gas such as the air, to be subjected to electrochemical reactions at gas diffusion electrodes, thereby generating the electric power and the heat simultaneously.

The structure of a conventional polymer electrolyte fuel cell is described below.

FIG. 2 is a sectional view schematically illustrating a membrane electrode assembly (hereinafter referred to as MEA) in the conventional polymer electrolyte fuel cell. A pair of catalytic reaction layers 12, which are mainly composed of carbon powder with a platinum catalyst, are closely attached to both faces of a polymer electrolyte film 11. A pair of diffusion layers 13 having both the gas permeability and the electrical conductivity are further arranged on the respective outer faces of the catalytic reaction layers 12. The polymer electrolyte film 11, the pair of catalytic reaction layers 12, and the pair of diffusion layers 13 constitute an MEA 14.

A pair of conductive separator 15 is placed at both face of the MEA 14, so that a plurality of MEAs 14 are electrically connected with one another in series. A gas flow path 15a is formed between the separator 15 and the MEA 14 in order to supply fuel such as hydrogen gas and oxidant gas to the electrode, and in order to flow out a gas generated by the electrochemical reaction and non-reacted remaining fuel gas. The gas flow path may be provided independently of the separator, but in general, grooves formed on the surface of the separator 15 function as the gas flow path 15a. A conventional example of the separator 15 is a cut piece of a plate, which is obtained by sintering glassy carbon under high pressure at high temperature.

A cooling flow path is provided on the other surface of the separator 15 to circulate cooling water and keep the temperature of the fuel cell. Circulation of cooling water enables the thermal energy generated by the reaction to be utilized, for example, in the form of hot water.

Gas sealings and O-rings are placed around the MEA 14 across the polymer electrolyte film 11, in order to prevent gasses from leaking or from mixing with each other and in order to prevent the cooling water from leaking. Gaskets that are composed of a resin or a metal plate and have substantially the same thickness as that of the MEA may also be arranged around the MEA, and the clearance between the gasket and the separator may be sealed with a grease or an adhesive.

In most cases, a large number of unit cells are laid to construct a stack structure of fuel cells. A cooling plate is provided for every one or two unit cells, in order to cool the fuel cell. The cooling plate is generally a thin metal plate in which a cooling water is flowing. Another possible configuration makes the separator itself function as a cooling plate. In this case, a water path is formed on the rear face of the separator, which includes in each unit cell. In this structure, O-rings and gaskets are also required to seal a cooling water. The O-rings in the seal should be smashed or flattened completely to ensure the sufficient electrical conductivity between the cooling plate.

In the stack of fuel cells, the conventional arrangement has an internal manifold, in which supply inlets and exhaust outlets of gases and cooling water to and from the respective unit cells are disposed inside the cell. In the case where a reformed gas is used as the fuel gas, however, the CO concentration rises in the downstream area of the flow path of the fuel gas in each unit cell. This may cause the electrode to be poisoned with CO, which results in lowering the temperature and thereby further accelerating the poisoning of the electrode. In order to relieve the deterioration of the cell performance, an external manifold is noted as a preferable configuration that increases the length of the gas supply and exhaust system between the manifold and each unit cell.

In either of the internal or the external manifold, the gas flow paths should be formed by a cutting process when a dense carbon plate or glassy carbon plate having the gas tight property is used for the material of the separators. The cutting process, however, undesirably prevents mass production of the fuel cells with a low manufacturing cost.

The carbon plate typically has porosity and thereby relatively poor gas tight property. A carbon plate impregnated with a resin is thus generally used for the separators of the fuel cells. The cured resin, however, hardly has elasticity, so that the carbon plate impregnated with the resin after the cutting process of the gas flow paths may have a warpage. It is thus required to carry out the formation of the gas flow paths after the carbon plate is impregnated with the resin. When a phenol resin or a silicone resin is used as the impregnating agent, the separator has insufficient acid resistance.

Another possible application mixes carbon powder or metal powder with a resin and manufactures a separator by compression molding or injection molding. In this case, the resin should have sufficient acid resistance. When a hard material like polytetrafluoroethylene is used for the separator, the molded separator does not have sufficient fluidity.

When the resin used as the impregnating agent has poor fluidity, it is required to decrease the content of the resin. A specific part of the molded separator that requires the gas tight property should thus be impregnated again with a resin.

DISCLOSURE OF INVENTION

The object of the present invention is to provide a compact fuel cell stack that is manufactured by a simple process.

At least part of the above and the other related objects is realized by a fuel cell stack including a plurality of unit cells. Each of the unit cells includes a polymer electrolyte film, a pair of electrodes that are arranged across the polymer electrolyte film and respectively have a catalytic reaction layer, and a pair of separators, one having a means for supplying fuel gas to one of the electrodes and the other having a means for supplying oxidant gas to the other of the electrodes. The separator has a laminate structure comprising a gas-tight conductive plate A and another conductive plate B having at least one slit, which continuously meanders from one end to another end of the conductive plate B.

In accordance with one preferable application of the present invention, the laminate structure includes at least one gas-tight conductive plate A and at least two conductive plates B, and the gas-tight conductive plate A is disposed on both outer-most layers of the fuel cell stack.

In one preferable embodiment of the present invention, the slit has an end that is not open to outside on a plane of the conductive plate B, and the fuel cell stack has an internal manifold that causes a gasses to be fed to and discharged from each of the unit cells.

In another preferable embodiment of the present invention, the slit has an end that is open to outside on a plane of the conductive plate B, and the fuel cell stack has an external manifold that is arranged on a side face of the fuel cell stack, which causes gasses to be fed to and discharged from each of the unit cells.

In still another preferable embodiment of the present invention, the conductive plate B has a lug formed by an end of the slit, and the fuel cell stack has an external manifold that is arranged on a side face of the fuel cell stack, which causes gasses to be fed to and discharged from each of the unit cells.

In this structure, it is preferable that the lug is located inside the external manifold.

It is preferable that the electrolyte is a proton-conductive polymer electrolyte.

It is also preferable that the separator has a side face sealed with a gas-tight material in the fuel cell stack.

It is further preferable that the separator has a laminating surface sealed with a gas-tight material in the fuel cell stack.

It is also preferable that the conductive plate B is a punched metal plate.

BEST MODE FOR CARRYING OUT THE INVENTION

The present invention provides a fuel cell stack comprising a plurality of unit cells, each of the unit cells comprising a polymer electrolyte film, a pair of electrodes that are arranged across the polymer electrolyte film and respectively have a catalytic reaction layer, and a pair of separators, one having a means for supplying fuel gas to one of the electrodes and the other having a means for supplying oxidant gas to the other of the electrodes, wherein the separator has a laminate structure comprising a gas-tight conductive plate A and another conductive plate B having at least one slit which continuously meanders from one end to another end of the conductive plate B.

The present invention is characterized by the specific arrangement that the separator has a laminated structure by a gas-tight conductive plate A and another conductive plate B having at least one slit, which continuously meanders from one end to another end of the conductive plate B. Namely the separator of the present invention mainly comprises two different conductive plates. One is the flat conductive plate A having gas tight property, and the other is the conductive plate B having at least one slit that continuously runs in zigzag from one end to the other end of the conductive plate B. In other words, the slit is in the serpentine form.

The conductive plates A and B may be composed of stainless steel, a metal such as aluminum, glassy carbon, or an electrically conductive resin. The conductive plate A is a flat plate without any pores, holes or grooves and has gas tight property.

In order to constitute a unit cell, a pair of separators, each including at least one conductive plate A and at least one conductive plate B, are arranged on both sides of the MEA. In particular, a laminate of one conductive plate A and two conductive plates B arranged across the conductive plate A is disposed between two adjacent MEAs in the unit cells. A laminate including the conductive plate A and the conductive plate B is arranged on both outer-most layers of the fuel cell stack or the unit cells.

The following describes the conductive plate B, which is the most important characteristic of the present invention.

The conductive plate B applicable for the internal manifold-type fuel cell stack is described with reference to FIGS. 3 and 4.

Figure 3:
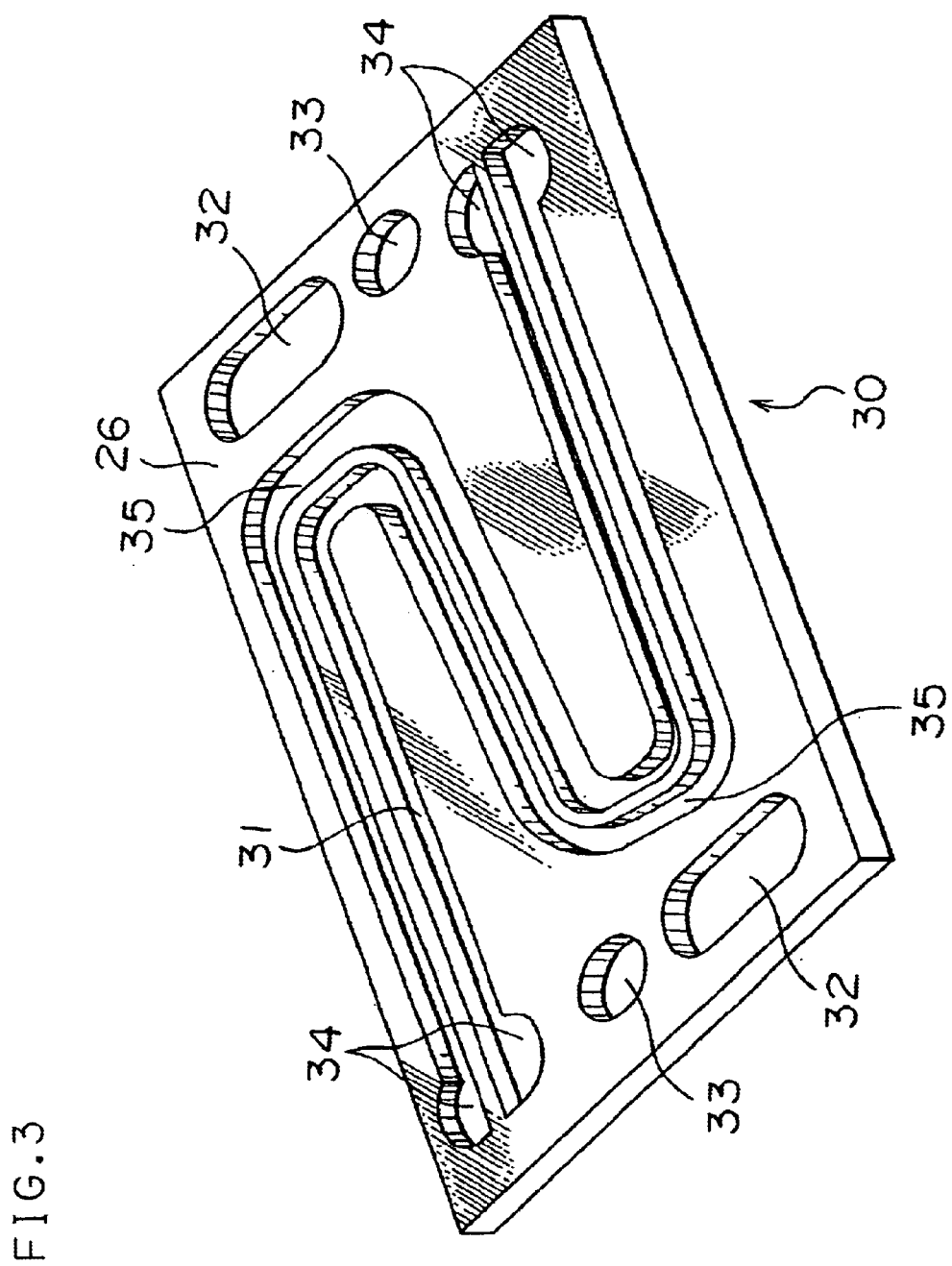
FIG. 3 is a perspective view schematically illustrating a conductive plate that is included in a separator of the present invention and has at least one slit, which continuously meanders from one end to another end of the conductive plate.

FIG. 3 is a perspective view schematically illustrating a conductive plate B 30 having at least one slit that continuously meanders from one end to another end of the conductive plate B. The conductive plate B shown in FIG. 3 functions to make a flow of the gas in the separators of the fuel cell stack of the present invention.

Referring to FIG. 3, a conductive plate B 26 has two slits 31 that continuously meander from one longitudinal end to the other longitudinal end of the conductive plate B 26. The slit 31 forms a flow path of either the gaseous fuel or the oxidant gas.

The conductive plate B is applied for the internal manifold-type fuel cell stack, and has gas manifold through holes 32 and cooling water manifold through holes 33 formed therein. Both ends of the slit 31 are located on the opposite corners of the conductive plate B and are not open to outside, so as to form mating gas manifold through holes 34. In the case of the external manifold-type fuel cell stack, on the other hand, the conductive plate B does not have these manifold through holes and has a slit having both ends open to outside as described later.

The slit 31 as shown in FIG. 3 has two bends 35, but the number of bends may be changed according to the requirements.

Figure 4:
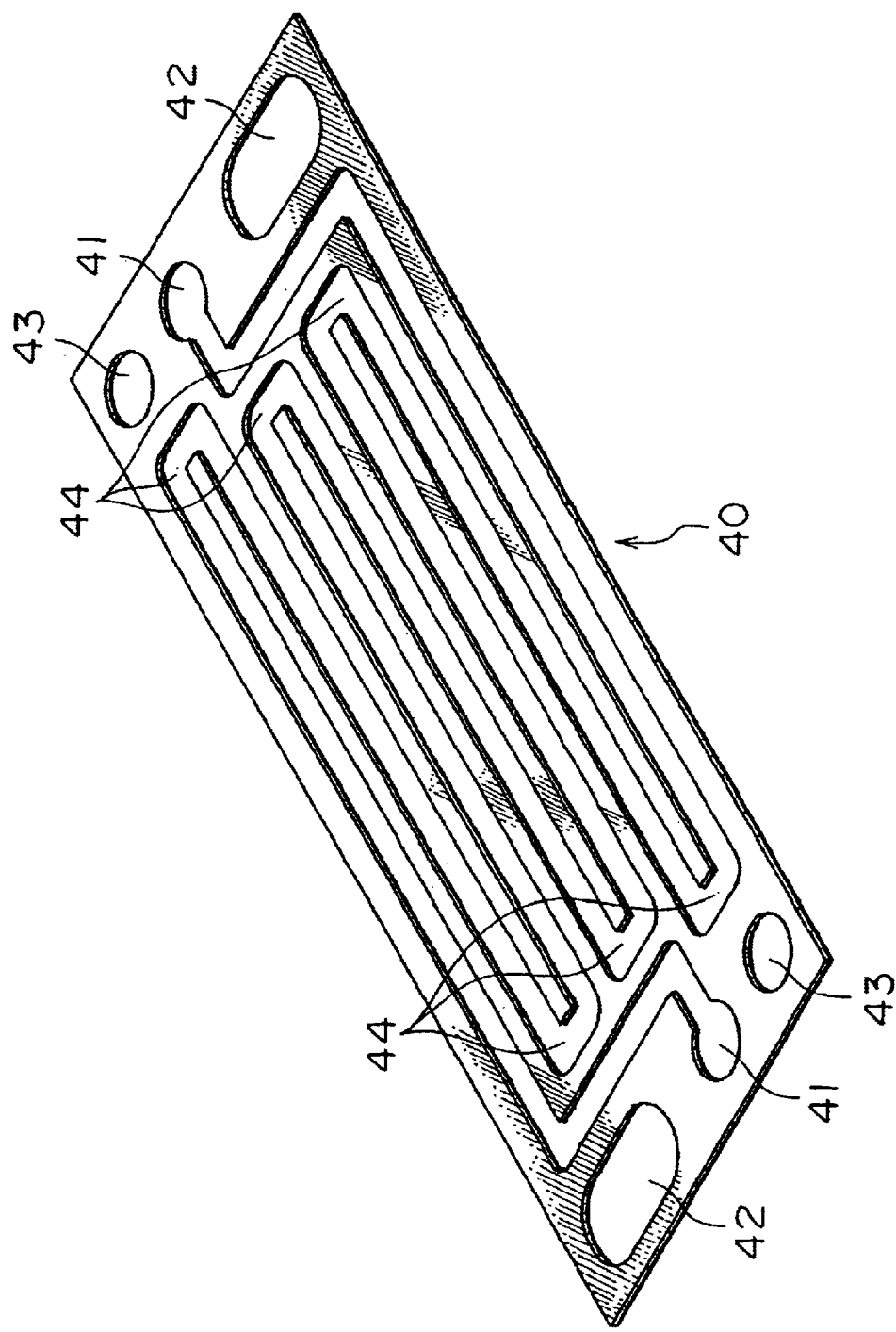
FIG. 4 is a perspective view schematically illustrating another conductive plate that is included in a separator of the present invention and has a slit.

FIG. 4 shows another example of the conductive plate B that makes a flow of cooling water in the separator.

In a conductive plate B 40 shown in FIG. 4, a slit that continuously meanders from one end to the other end of the conductive plate B 40 has ends 41, which are located substantially on the center of the ends of the conductive plate B 40. The conductive plate B 40 also has gas manifold through holes 42 and 43 and cooling water manifold through holes at the ends 41.

The slit has six bends 44 to improve the cooling ability in the example of FIG. 4, but the number of bends may be changed according to the requirements.

Figure 5:
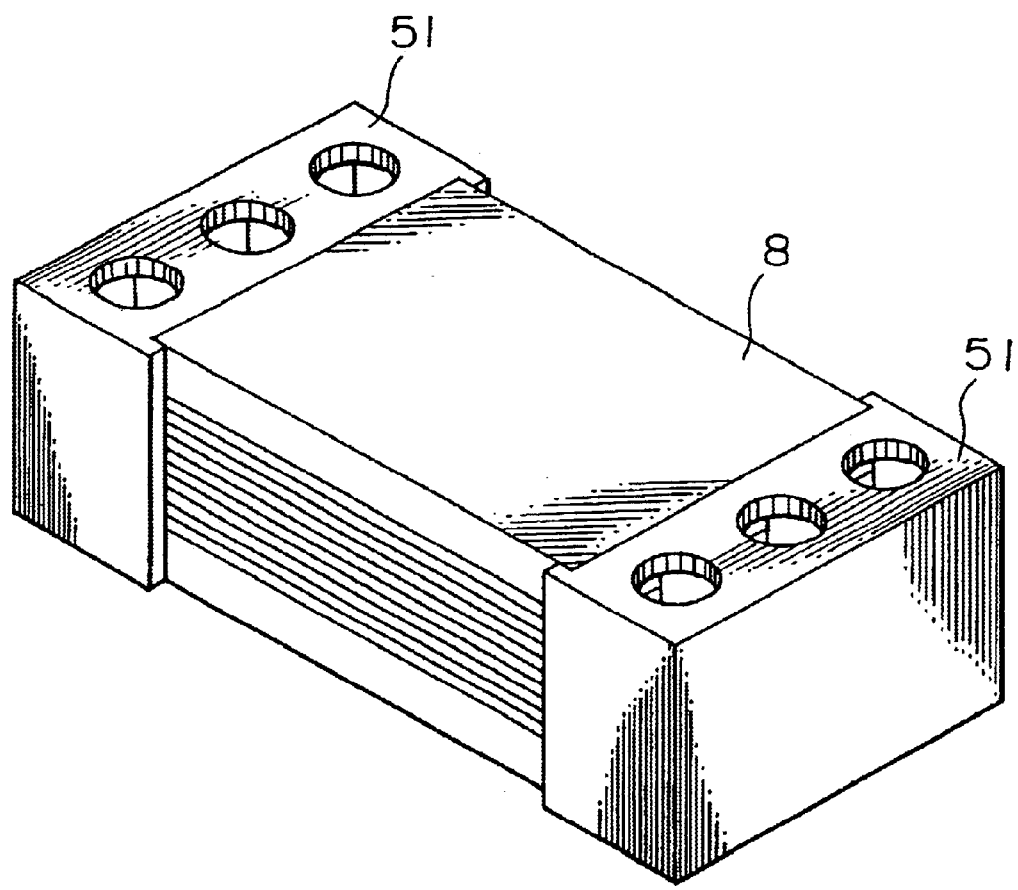
FIG. 5 is a perspective view schematically illustrating an external manifold-type fuel cell stack in one embodiment of the present invention.
Figure 6:
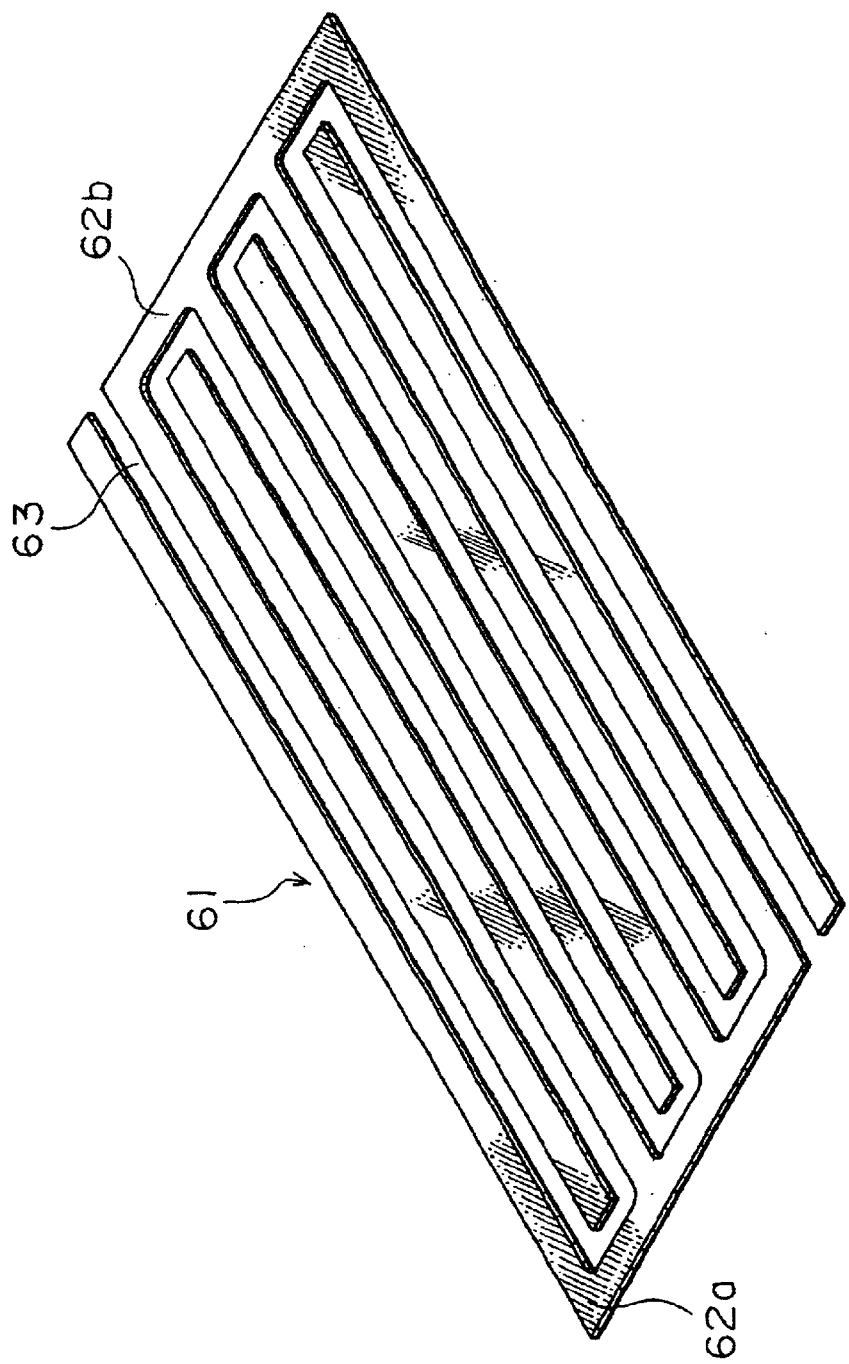
FIG. 6 is a perspective view schematically illustrating a conductive plate that is included in a separator for the external manifold configuration of the present invention and has a slit.
Figure 7:
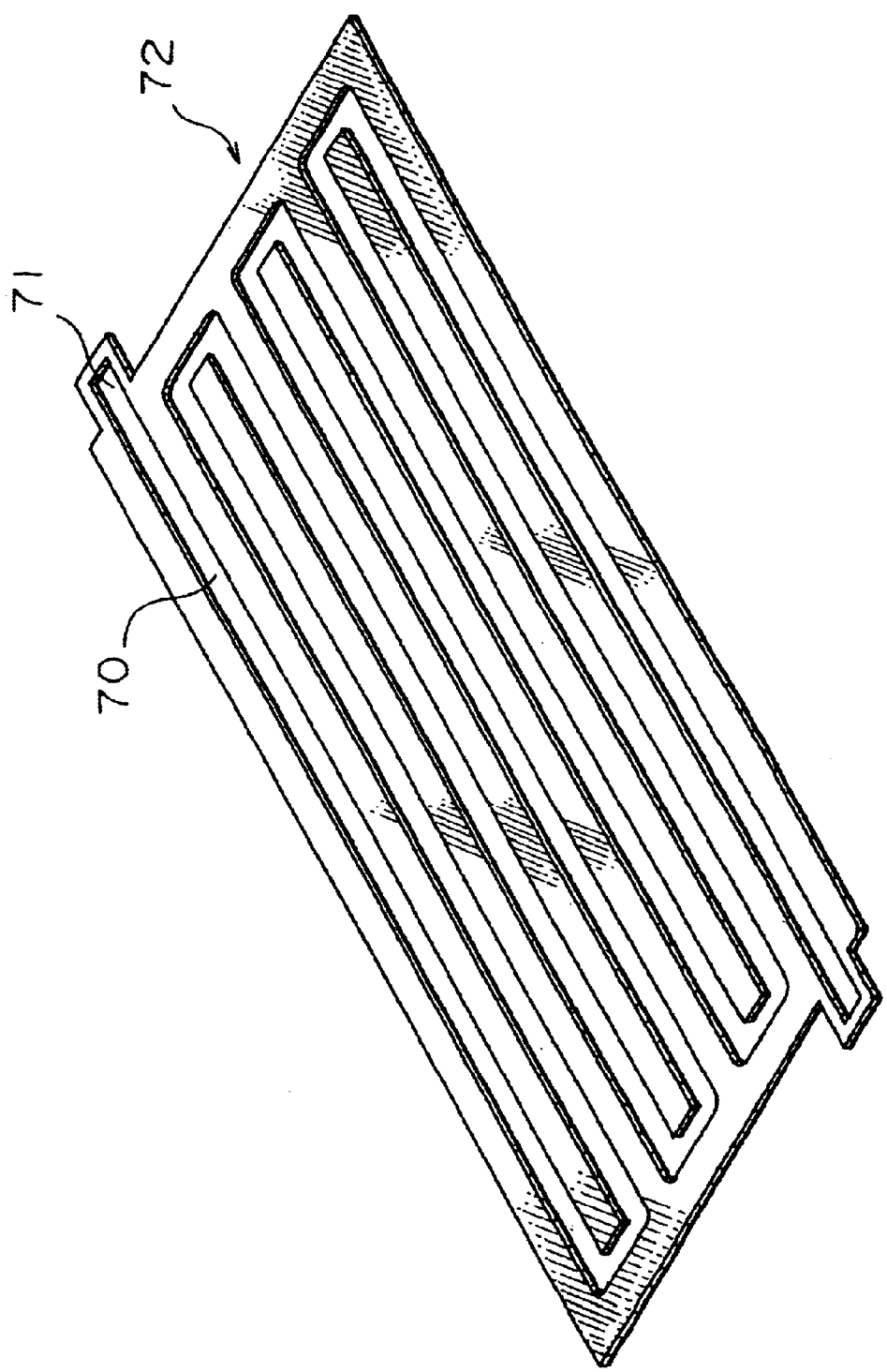
FIG. 7 is a perspective view schematically illustrating another conductive plate that is included in a separator for the external manifold configuration of the present invention and has a slit.

With reference to FIGS. 6 and 7, the following describes the conductive plate B applicable for the external manifold-type fuel cell stack as shown in FIG. 5.

A conductive plate B 60 shown in FIG. 6 has a slit 60 that continuously meanders from one end to the other end of the conductive plate B. Unlike the conductive plates B shown in FIGS. 3 and 4, the conductive plate B shown in FIG. 6 does not have manifold through holes for flows of the gas and the cooling water.

In the conductive plate B shown in FIG. 6, the slit 60 is open to outside of the conductive plate B and is constituted by two members 62a and 62b. The two plates 62a and 62b punched out in a comb-like shape are combined together to form the slit 60.

A conductive plate B 72 shown in FIG. 7 solves the problem of the conductive plate B shown in FIG. 6, that is, the separation of the conductive plate B into two members. A slit 70 has one end 71, which forms a lug 71 located outside the conductive plate B 72 and is not open to the outside. This arrangement prevents the conductive plate B from being separated into two members and facilitates the assembly of the fuel cell stack.

In the external manifold-type fuel cell stack, it is preferable that external manifolds for feeding and discharging the gases to and from the respective unit cells are disposed on the side faces of the fuel cell stack. In the case of the conductive plate B 72 shown in FIG. 7, the ends 71 of the slit 70 are preferably located inside the external manifolds. This desirably makes the fuel cell stack compact.

The conductive plate B included in the separator of the present invention is punched out of the metal plate discussed above.

It is preferable that the separator laminate including the conductive plate B has a side face and/or a laminating face sealed with a gas-tight material.

Some examples of the present invention are given below, although the present invention is not restricted at all to these examples.

EXAMPLE 1

A carbon powder having the particle diameter of not greater than several microns was dipped into an aqueous solution of chloroplatinic acid. The platinum particle was carried on the surface of the carbon powder by reduction of the aqueous solution. The weight ratio of carbon to platinum carried thereon was 1:1. Then, the carbon powder with the platinum catalyst carried thereon was dispersed into an alcohol solution of a polymer electrolyte to obtain a slurry.

On the other hand, a carbon paper having a thickness of 400 $\mu$m, which was the supporting material of electrodes, was impregnated with an aqueous dispersion of a fluorocarbon resin (Neoflon ND-1 manufactured by DAIKIN INDUSTRIES, LTD.). After drying, the impregnated carbon paper was heated at 400° C. for 30 minutes to give the water repellency to the carbon paper.

Figure 1:
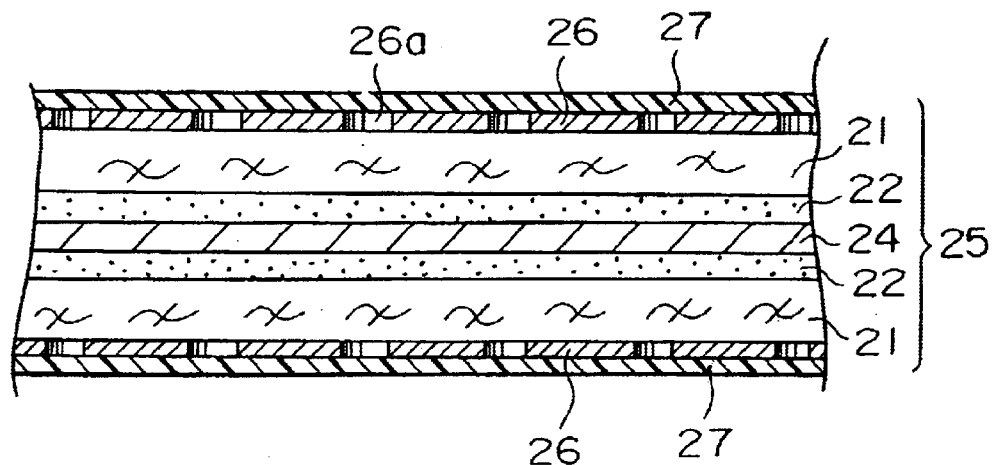
FIG. 1 is a sectional view schematically illustrating an MEA in a polymer electrolyte fuel cell in according with the present invention.
Figure 2:
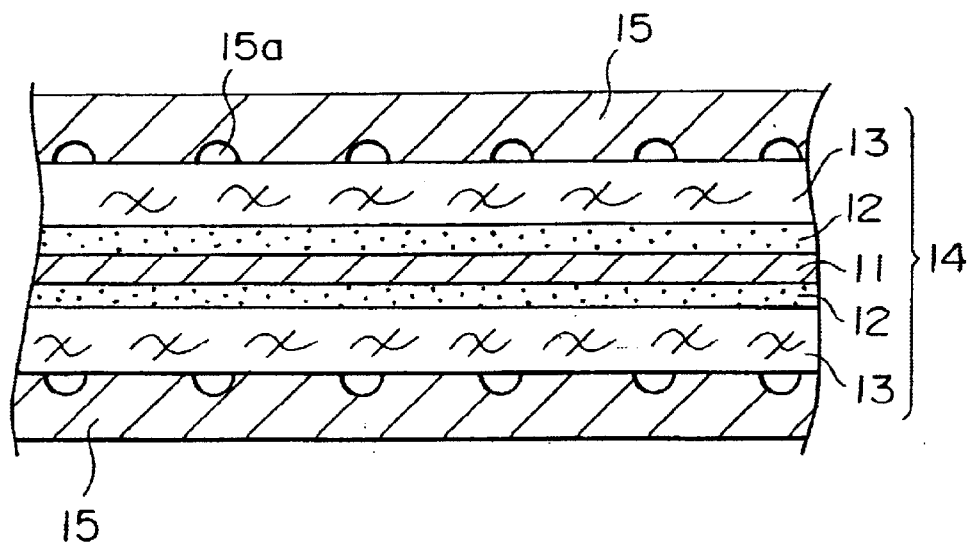
FIG. 2 is a sectional view schematically illustrating an MEA in a conventional polymer electrolyte fuel cell.

Referring to FIG. 1, the slurry containing the carbon powder was applied uniformly on a single face of water-repelled carbon paper 21 to form a catalytic layer 22 of 20 $\mu$m in thickness and obtain an electrode 23.

A pair of the carbon-paper electrodes 23 having the catalytic layers 22 was laid across a polymer electrolyte film 24 of 25 $\mu$m in thickness in such a manner that the respective catalytic layers 22 of the electrodes 23 were in contact with the polymer electrolyte film 24, followed by drying to obtain an MEA 25. The polymer electrolyte film 24 was a proton-conductive polymer electrolyte comprising of a polymer of perfluorocarbon sulfonate. A pair of conductive plates B 26, which constituted the separators, was arranged across the MEA 25 and a pair of conductive plates A 27, which constituted the separators, was arranged on both outer faces of the conductive plates B 26. This completed a unit cell.

The conductive plate B 26 comprised SUS 316 having a thickness of 1 mm. Slits 31 having a width of 2 mm for the flow of a gas were formed by means of laser on the surface of the conductive plate B 26 as shown in FIG. 3. The conductive plate B 26 also had gas manifold through holes 32 and cooling water manifold through holes 33 disposed in the periphery thereof. In the process of interposing the MEA 25 between the pair of conductive plates B 26, gaskets having the same outer dimensions as those of the conductive plates B 26 were disposed around the electrodes 23. The gaskets were obtained by bonding a pair of sheet of an ethylene-propylene-diene terpolymer compound to both surfaces of a sheet of polyethylene terephthalate sheet.

After lamination of two such unit cells, a pair of the conductive plates B 40 having the slit for making the cooling water flow path was disposed as shown in FIG. 4, across the laminated unit cells. This completed a unit cell laminate.

A fuel cell stack was assembled by laying fifty unit cell laminates, each including two unit cells, one upon another and disposing a pair of metallic current collectors, a pair of insulator plates, and a pair of end plates in this order on both sides of the cell laminate. The end plates were fastened and fixed with bolts passing through the cell laminate and nuts. This completed a fuel cell stack including 100 unit cells.

Evaluation

A battery test was carried out while the gaseous hydrogen and the air were flown into and the cooling water was circulated through the fuel cell stack. The cell output power was 1020 W (30 A–35 V) under the conditions of the hydrogen utilization of 70%, the oxygen utilization of 20%, the humidified hydrogen bubbler temperature of 85° C., the humidified oxygen bubbler temperature of 75° C., and the cell temperature of 75° C.

As described above, each separator of Example 1, which parts the adjoining unit cells from each other, includes the gas-tight conductive plate A and the conductive plate B having the grooves for the flow of a fluid. Compared with the conventional carbon separators, this arrangement advantageously reduces the thickness of the separators and thereby decreases the manufacturing cost.

EXAMPLE 2

In Example 2, the side faces of a fuel cell stack, which included 100 unit cells and was manufactured in the same manner as in Example 1, was sealed with a gas-tight rubber. The gas-tight rubber used here was a phenol resin. The phenol resin solution was spreaded on the side faces of the fuel cell stack and dried to seal the side faces of the fuel cell stack.

Evaluation

A battery test of the fuel cell stack thus obtained was carried out under the same conditions as those of Example 1. The output power of the fuel cell stack was 1080 W (30 A–36 V).

A leak test of this fuel cell stack was also carried out. In the test, an outlet of cooling water was closed and a hydraulic pressure was applied from an inlet of cooling water. No leakage of water was observed under the hydraulic pressure of 1 kgf/cm$^2$. This proved the sufficient sealing property. From the result, it was confirmed that the arrangement of sealing the side faces of the fuel cell stack is extremely effective to improve the sealing property of the fuel cell stack.

The method of Example 2 applies the sealing rubber on the side faces of the fuel cell stack, which has been obtained previously by laying a plurality of unit cells and fixing the cell stack with the end plates. This method significantly decreases the number of manufacturing steps, compared with the conventional method that spreads the sealing rubber on the side faces of each unit cell while the unit cells are laid one upon another.

EXAMPLE 3

In Example 3, an external manifold-type fuel cell stack was assembled as shown in FIG. 5 from the unit cells, which were manufactured in the same manner as in Example 1.

In first, specific parts corresponding to the internal manifolds were cut out from the unit cells manufactured in Example 1, and caused inlets and outlets of gases and cooling water to be exposed to the side faces of the unit cells.

A phenol resin used as the sealing rubber was spreaded on the side faces of the fuel cell stack and dried to seal the side faces of the fuel cell stack. In this example, the path of the inlets and outlets of gases and cooling water were not sealed by the sealing rubber. The phenol resin solution was carefully spreaded to make a flat sealing surface, which was in contact with the external manifold.

As shown in FIG. 5, the external manifolds 51 of stainless steel was arranged on the side faces of a unit cells 8 to cover an array of the exposed inlets of the air. In a similar manner, external manifolds were arranged to cover the outlets of the air, the inlets and outlets of hydrogen gas, and the inlet and outlets of the cooling water. These external manifolds were fixed with screws for the end plates.

The gaskets were obtained by cutting a sheet of ethylene-propylene-diene terpolymer compound having closed cells to a predetermined shape corresponding to the sealing surface of the external manifold. The gaskets were used for sealing the clearance between the external manifold and the sealing material covering the side face of the cell laminate.

Evaluation

A battery test of the fuel cell stack thus obtained was carried out under the same conditions as those of Example 1. The output power of the cell stack was 1080 W (30 A–36 V). The seal of the external manifold was checked for a gas leak. No leakage was observed, which proved the favorable sealing property.

As described above, the arrangement of spreading the sealing rubber on the whole side face of the polymer electrolyte fuel cell enables the external manifold configuration, which is typically applied for the molten carbonate fuel cells.

The arrangement of Example 3 enables the manifolds and the cell to be manufactured separately. This enables the unit cells having the identical shape of separators and MEAs to be mass production, regardless of the applications and the output power. This advantageously reduces the manufacturing cost.

EXAMPLE 4

The process of Example 4 applied the conductive plate B shown in FIG. 6 for the separator having the flow paths of gas and cooling water and assembled an external manifold-type fuel cell stack by laying the unit cells manufactured in Example 3.

Evaluation

A battery test of the fuel cell stack thus obtained was carried out under the same conditions as those of Example 1. The output power of the cell stack was 1080 W (30 A–36 V).

The conductive plate B used for the separator has a through groove in the thickness of the conductive plate B. The through slit continuously meandering from one end to the other end of the conductive plate B favorably reduces the manufacturing cost.

EXAMPLE 5

The process of Example 5 applied the conductive plate B shown in FIG. 7 for the separator having the flow paths of gas and cooling water and assembled an external manifold-type fuel cell stack by laying the unit cells manufactured in Example 4.

Evaluation

A battery test of the fuel cell stack was carried out under the same conditions as those of Example 1. The output power of the cell stack was 1080 W (30 A–36 V).

The conductive plate B of Example 4 was fabricated by two separate parts and thus requires some time for assembly. The conductive plate B of Example 5, however, has only one part and thus improves the assembling property. In the separator of Example 5, the ends of the slit extend outside the contour of the conductive plate B. This configuration, however, did not prevent the external manifolds from being attached to the cell without any troubles.

The conductive plates B having the shape shown in FIG. 7 were manufactured by etching and pressing. These plates gave substantially the same results in the battery test.

INDUSTRIAL APPLICABILITY

As described above, the technique of the present invention simplifies the assembly of the fuel cell stack and provides a fuel cell stack having the improved gas sealing property between the external manifolds and the side faces of the cell stack. The technique of the present invention has especial advantage for a stack of polymer electrolyte fuel cells.

What is claimed is:

1. A fuel cell stack comprising a plurality of unit cells, each of said unit cells comprising;
   - an assembly comprising a polymer electrolyte film and a pair of electrodes that are arranged across said polymer electrolyte film and respectively have a catalytic reaction layer; and
   - a pair of separators that are arranged across said assembly, one having a means for supplying fuel gas to one of said electrodes and the other having a means for supplying oxidant gas to the other of said electrodes,
   - wherein said separators between said assemblies of adjacent unit cells are formed as a laminate of at least one gas-tight conductive metal plate A, and at least two conductive metal plates B each having at least one slit which continuously meanders from one end to another end of said conductive plate B, each of said conductive metal plates B being a punched metal plate, wherein the outermost separators of said fuel cell stack are each formed as a laminate of another gas-tight conductive metal plate A and another conductive metal plate B having at least one slit, which continuously meanders from one end to another end of said conductive plate B, said another conductive plate B being a punched metal plate, wherein each conductive plate B has a lug formed by an end of said slit, said fuel cell stack furthering comprising an external manifold that is arranged on a side face of said fuel cell stack, so as to cause a gas to be fed to and discharged from each of said unit cells.

2. The fuel cell stack in accordance with claim 1, wherein said lug is located inside said external manifold.

3. The fuel cell stack in accordance with claim 1, wherein said electrolyte is a proton-conductive polymer electrolyte.

4. The fuel cell stack in accordance with claim 1, wherein each separator has a side face sealed with a gas-tight material.

5. The fuel cell stack in accordance with claim 1, wherein each separator has a laminating surface sealed with a gas-tight material.

* * * * *